(12) United States Patent
Matsumoto et al.

(10) Patent No.: US 6,868,324 B2
(45) Date of Patent: Mar. 15, 2005

(54) TRAVEL CONTROL SYSTEM FOR VEHICLE

(75) Inventors: Shinji Matsumoto, Kanagawa (JP); Genpei Naito, Yokohama (JP); Satoshi Tange, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/361,558

(22) Filed: Feb. 11, 2003

(65) Prior Publication Data

US 2003/0163238 A1 Aug. 28, 2003

(30) Foreign Application Priority Data

Feb. 27, 2002 (JP) ........................................ 2002-051772

(51) Int. Cl.[7] ............................................... B60T 8/00
(52) U.S. Cl. ............................. 701/72; 701/70; 701/71
(58) Field of Search ............................. 701/70, 72, 45, 701/207, 93; 340/441, 438

(56) References Cited

U.S. PATENT DOCUMENTS

| | | | |
|---|---|---|---|
| 5,315,295 A | | 5/1994 | Fujii |
| 5,757,949 A | * | 5/1998 | Kinoshita et al. ............ 382/104 |
| 5,978,731 A | * | 11/1999 | Matsuda ........................ 701/208 |
| 6,070,121 A | * | 5/2000 | Matsuda ........................ 701/205 |
| 6,424,904 B1 | * | 7/2002 | Takahashi et al. ............. 701/70 |
| 2001/0029419 A1 | | 10/2001 | Matsumoto et al. ............ 701/8 |

FOREIGN PATENT DOCUMENTS

JP 4-236699 A 8/1992

* cited by examiner

Primary Examiner—Thomas G. Black
Assistant Examiner—Christine Behncke
(74) Attorney, Agent, or Firm—Foley & Lardner LLP

(57) ABSTRACT

A vehicle travel control system is arranged to obtain curve information as to a curve of a road ahead of the vehicle, to obtain a vehicle driving condition produced by a vehicle occupant, to obtain a curve entering degree of the vehicle into the curve on the basis of the driving condition, to obtain a vehicle speed, and to decelerate the vehicle on the basis of the curve information and the curve entering degree and the vehicle speed.

16 Claims, 8 Drawing Sheets

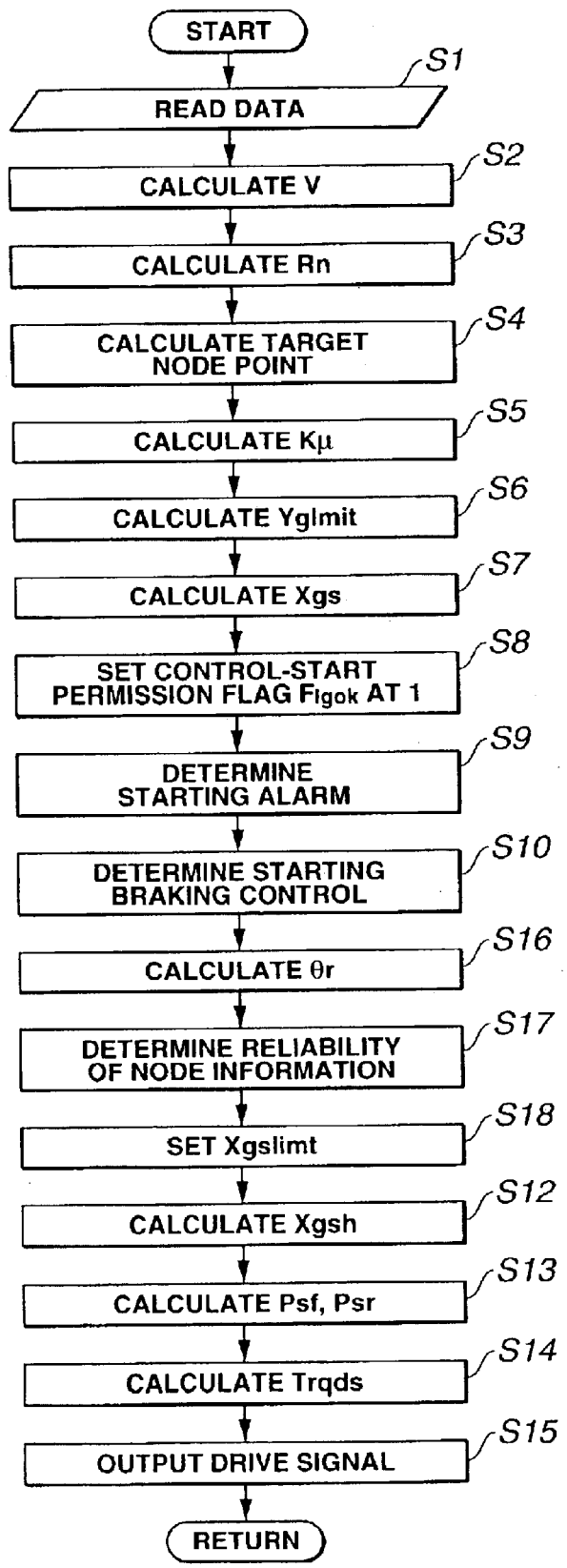

TRAVEL CONTROL SYSTEM FOR VEHICLE

BACKGROUND OF THE INVENTION

The present invention relates to a travel control system for a vehicle, and more particularly to a travel control system, which controls a vehicle on the basis of road information obtained from a car navigation system.

Japanese Patent Provisional Publication No. 4-236699 discloses a travel control system using road information stored in a car navigation system. This travel control system is arranged to detect a curve shape of a road ahead of a vehicle and to decelerate the vehicle according to the curve shape when the vehicle enters the curve.

SUMMARY OF THE INVENTION

However, since this earlier art is arranged to detect a vehicle position from information of the car navigation system, an error of the vehicle position tends to become large. Therefore, this system has been arranged to set the deceleration for a curve traveling at a small value so as to prevent a vehicle occupant from having strange feeling in a vehicle deceleration even if there is caused an inappropriate starting of the vehicle deceleration due to a large error in the vehicle position.

It is therefore an object of the present invention to provide an improved travel control system for a vehicle, which system achieves a sufficient advantage in the vehicle control while preventing a vehicle occupant from having strange feeling in deceleration of the vehicle.

An aspect of the present invention resides in a travel control system for a vehicle, which system comprises a control unit that is configured to obtain curve information as to a curve of a road ahead of the vehicle, to obtain a driving condition produced by a vehicle occupant, to obtain a curve entering degree of the vehicle into the curve on the basis of the driving condition, to obtain a vehicle speed, and to decelerate the vehicle on the basis of the curve information and the curve entering degree and the vehicle speed.

Another aspect of the present invention resides in a travel control system for a vehicle, which system comprises a control unit that is configured to obtain curve information as to a curve of a road ahead of the vehicle, to obtain a vehicle speed, to calculate a desired deceleration on the basis of the curve information and the vehicle speed, to decelerate the vehicle on the basis of the desired deceleration, to obtain a driving condition produced by a vehicle occupant, to determine a reliability of the curve information on the basis of the driving condition and the curve information, and to correct the desired deceleration on the basis of the reliability of the curve information.

A further another aspect of the present invention resides in a travel control system for a vehicle. The travel control system comprises a road information obtaining system that obtains road information as to a curve of a road ahead of the vehicle, from one of an external information system and an information storage system in the vehicle; a vehicle driving condition detector detecting a driving condition of the vehicle, which condition is varied by a vehicle occupant; a wheel speed detector detecting at least one of wheel speeds of wheels of the vehicle; a brake system that generates a braking force according to a braking command; and a control unit connected with the road information obtaining system, the vehicle driving condition detector, the wheel speed detector and the brake system. The control unit is configured to obtain the curve information from the road information obtaining system, to obtain the driving condition from the vehicle driving condition detector, to obtain a curve entering degree of the vehicle into the curve on the basis of the driving condition, to calculate a vehicle speed on the basis of the wheel speed, and to output the braking command to the brake system on the basis of the curve information and the curve entering degree and the vehicle speed to decelerate the vehicle.

Furthermore, according to the present invention, a method of controlling a vehicle, comprising: obtaining curve information of a road ahead of the vehicle; obtaining a driving condition produced by a vehicle occupant; obtaining a curve entering degree of the vehicle on the basis of the driving condition; obtaining a vehicle speed; and decelerating the vehicle on the basis of the curve information and the curve entering degree and the vehicle speed.

The other objects and features of this invention will become understood from the following description with reference to the accompanying drawings.

BRIEF DESCRIPTION OF THE DRAWINGS

FIG. 9 is a flowchart showing a calculation processing executed by the driving/braking force control unit of a second embodiment according to the present invention.

DETAILED DESCRIPTION OF THE INVENTION

With reference to drawings, there will be discussed embodiments of a travel control system according to the present invention hereinafter.

Referring to FIGS. 1 through 7, there is shown a first embodiment of the travel control system for a vehicle according to the present invention.

Figure 1:
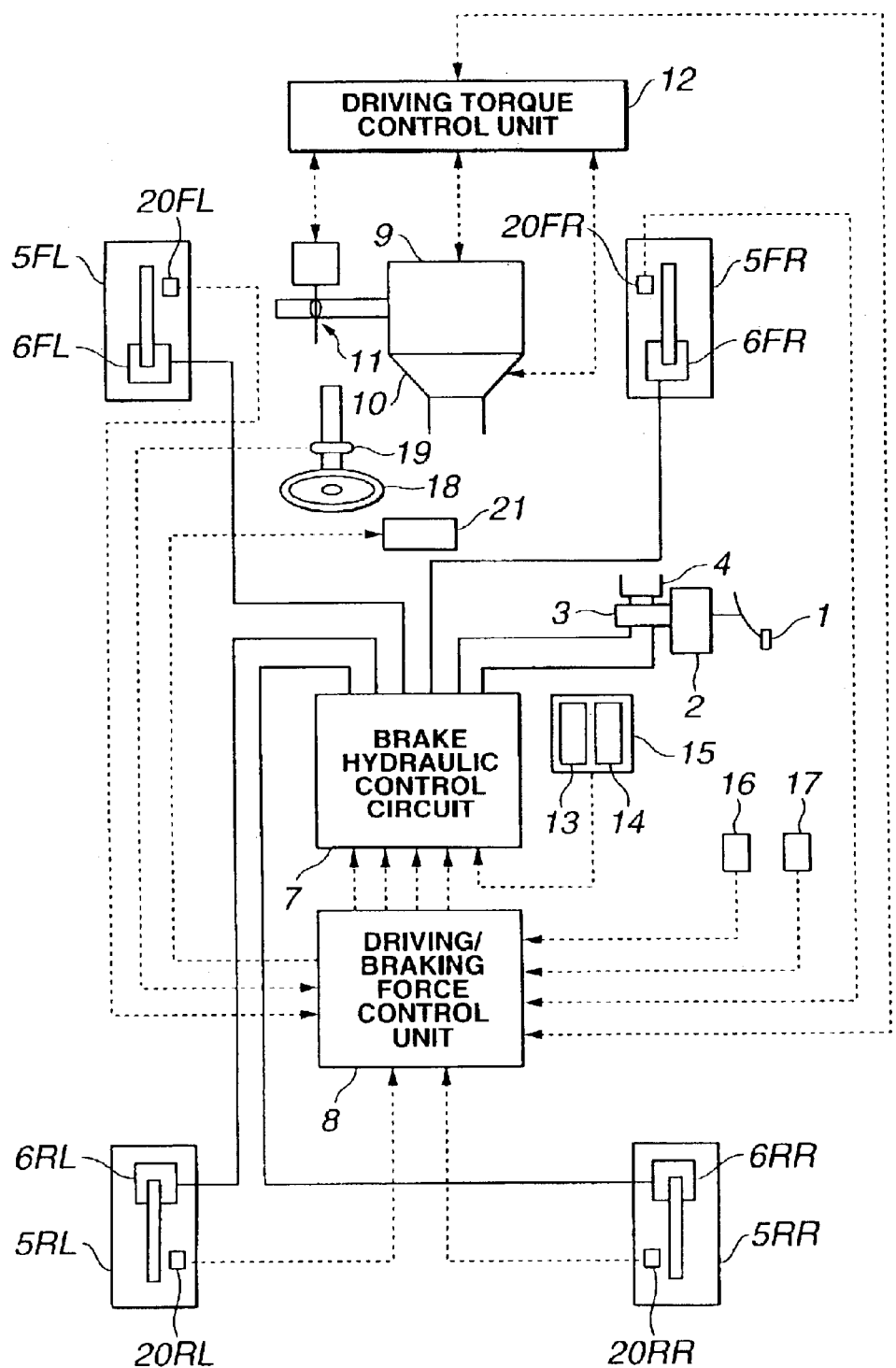
FIG. 1 is a schematic view showing a travel control system of a first embodiment according to the present invention.

As shown in FIG. 1, the vehicle of a rear-wheel drive type is equipped with an automatic transmission and a conventional differential gear. The vehicle comprises a brake system which is capable of independently controlling a braking force of each of front-left, front-right, rear-left and rear-right wheels 5FL, 5FR, 5RL and 5RR. The brake system comprises a brake pedal 1, a booster 2, a master cylinder 3 and a reservoir 4. Normally, each of wheel cylinders 6FL, 6FR, 6RL and 6RR of the respective wheels 5FL, 5FR, 5RL and 5RR receives brake hydraulic pressure pressurized by master cylinder 3 according to a depression degree of brake pedal 1 depressed by a driver. Further, a brake hydraulic control circuit 7 is provided between master cylinder 3 and each of wheel cylinders 6FL, 6FR, 6RL, and 6RR so as to be capable of independently controlling the hydraulic pressure of each of wheel cylinders 6FL, 6FR, 6RL and 6RR.

Brake hydraulic control circuit 7 is common with a brake hydraulic pressure control circuit employed in an antiskid control system and/or a traction control system. In this embodiment, the brake system is arranged so as to independently increase and decrease brake hydraulic pressure of each of wheel cylinders 6FL, 6FR, 6RL and 6RR. Brake hydraulic control circuit 7 controls the brake hydraulic pressure of each of wheel cylinders 6FL, 6FR, 6RL and 6RR according to a command brake hydraulic pressure outputted from driving/braking force control unit 8.

The vehicle is further equipped with a driving torque control unit 12 which controls a driving torque applied to rear wheels 5RL and 5RR by controlling an operating condition of an internal combustion engine 9, a selected transmission ratio of an automatic transmission 10 and a throttle opening of a throttle valve 11. The control of the operating condition of engine 9 is executed by controlling a fuel injection quantity and ignition timing. Further, the control of the fuel injection quantity and the ignition timing may be simultaneously executed with the throttle opening control to control the operating condition of engine 9. Driving torque control unit 12 is capable of independently controlling the driving torque of rear wheels 5RL and 5RR acting as driving wheels. Further, when driving torque control unit 12 receives a command driving torque from driving/braking force control unit 8, driving torque control unit 12 controls the driving torque with reference to the command driving torque. Since this travel control system of the embodiment according to the present invention is capable of easily decelerating the vehicle by using at least one of lowing an output of engine 9, changing a gear ratio of automatic transmission 10 and increasing an output of wheel cylinders 6.

The vehicle is further equipped with a car navigation system 15 which comprises a GPS (Global Positioning System) 13 for detecting positional information $(X_0, Y_0)$ of the vehicle and a storage medium 14 which stores map information including road shapes. This car navigation system 15 is arranged to calculate (compute) node information $(X_n, Y_n, L_n)$ constructed by a distance to a node point on a road ahead of the vehicle and an absolute coordinate $(X_n, Y_n)$ at the node point, with reference to map information stored in storage medium 14. In this embodiment, the node information is obtained using car navigation system 15. Accordingly, when the vehicle travels on a road whose node information is obtained from car navigation system 15, the vehicle can execute the driving/braking force control without employing an external-state detecting device, such as a CCD camera and the like.

Furthermore, the vehicle is equipped with a master cylinder pressure sensor 16 for detecting a master cylinder pressure Pm indicative of an output pressure of master cylinder 3, an accelerator opening sensor 17 for detecting an accelerator opening Acc indicative of a depression degree of an accelerator pedal, a steer angle sensor 19 for detecting a steer angle θ of a steering wheel 18, and wheel speed sensors 20FL, 20FR, 20RL and 20RR for respectively detecting wheel speeds $Vw_{FL}$, $Vw_{FL}$, $Vw_{FL}$ and $Vw_{FL}$ of wheels 5FL, 5FR, 5RL and 5RR.

Driving/braking force control unit 8 receives detection signals of the above-discussed sensors 16, 17, 19, 20FL, 20FR, 20RL and 20RR installed in the vehicle. When the traveling condition indicative data treated by driving/braking force control unit 8 includes a directionality of leftward or rightward, the data indicative of leftward is represented by a positive value. Accordingly, when the host vehicle turns left, steer angle θ and other data relating thereto respectively take positive values.

Further, the vehicle is equipped with an alarm device 21 including a display and a speaker is installed in the vehicle, and provides information indicative of a starting of the braking force control to vehicle occupants according to a command obtained from the driving/braking force control unit 8.

Subsequently, a processing logic executed by driving/braking force control unit 8 will be discussed with reference to a flowchart of FIG. 2. This processing is a timer interruption routine executed at predetermined sampling time intervals ΔT such as 10 msec. Although this flowchart does not have a step for executing communication between control unit 8 and other devices, information obtained by the present processing is properly updated and stores the updated data in the storage device. Further, control unit 8 properly reads necessary data from the storage device.

At step S1, control unit 8 reads data outputted from various sensors, various controllers and control units shown in FIG. 1. Specifically, the data includes each wheel speed $Vw_i$ (i=FL, FR, RL and RR), accelerator opening Acc, master-cylinder pressure $P_m$, steer angle θ, driving torque Tw outputted from driving torque control unit 12, positional information $(X_0, Y_0)$ of the vehicle and node information $(X_n, Y_n, L_n)$ at the node point, which information is supplied from car navigation system 15.

At step S2, control unit 8 calculates a vehicle speed V of the vehicle from an average between front-left wheel speed $V_wFL$ and front-left wheel speed $V_wFR$. Further, if when ABS control system is active, an estimated vehicle speed estimated in the ABS control system may be employed as vehicle speed V.

At step S3, control unit 8 calculates a radius Rn of a curvature of a traveling road at each node point, on the basis of the node information $(X_n, Y_n, L_n)$ read at step S1. More specifically, control unit 8 calculates variables $x_a$, $y_a$, $x_b$ and $y_b$ from the following equations (1) using node information $(X_{n-1}, Y_{n-1}, L_{n-1})$ at (n−1)th node point from the vehicle, node information $(X_n, Y_n, L_n)$ at (n)th node point from the vehicle, and node information $(X_{n+1}, Y_{n+1}, L_{n+1})$ at (n+1)th node point from the vehicle.

$$x_a = K \cdot (x_n - x_{n-1})$$
$$y_a = K \cdot (y_n - y_{n-1})$$
$$x_b = K \cdot (x_{n+1} - x_{n-1})$$
$$y_b = K \cdot (y_{n+1} - y_{n-1}) \tag{1}$$

where $Ko = (X_n - X_{n-1})2 + (Y_n - Y_{n-1})^2$, and $K = (L_n - L_{n-1})/(Ko)^{1/2}$.

Subsequently, control unit 8 calculates variables $X_R$, $Y_R$, $R_R$ and A on the basis of variables $x_a$, $y_a$, $x_b$ and $y_b$ using the following equations (2).

$$X_R = (C_a \cdot y_b - C_b \cdot y_a)/A$$
$$Y_R = (C_a \cdot x_a - C_b \cdot x_b)/A$$
$$R_R = X_R^2 + Y_R^2 \tag{2}$$

where $C_a=(x_a^2+y_a^2)/2$, $C_b=(x_b^2+y_b^2)/2$, and $A=x_b \cdot y_b - x_b \cdot y_a$.

When variable A is smaller than 0.01 or when variable $R_R$ is greater than 4000000 (m), control unit 8 determines that a radius $R_n$ of road curvature at the n-th node point from the vehicle position is 2000 (m). When variable A is not smaller than 0.01 and when variable $R_R$ is not greater than 4000000 (m), control unit 8 calculates radius $R_n$ of the road curvature at the n-th node point from the vehicle position using the following equation (3). The radius $R_n$ of the road curvature takes a negative value when the vehicle turns left.

$$R_n = A/|A| \cdot (R_R)^{1/2} \quad (3)$$

Although the embodiment has shown and described such that radius $R_n$ of the road curvature is calculated from node information of three node points, the calculation method of radius $R_n$ of the road curvature is not limited to the method employed in this embodiment, and radius $R_n$ of the road curvature may be calculated by obtaining a straight line connecting ahead and behind node points relative to the target node point and calculating radius $R_n$ on the basis of a gradient of the obtained straight line. Further, although the embodiment has been shown and described such that radius $R_n$ of the road curvature is calculated on the basis of the coordination of corresponding node points from car navigation system 15, it may be obtained in a manner that radius $R_n$ of the road curvature has been previously stored as node information in the car navigation system 15 and the value indicative of radius $R_n$ is directly read from car navigation system 15.

Figure 3:
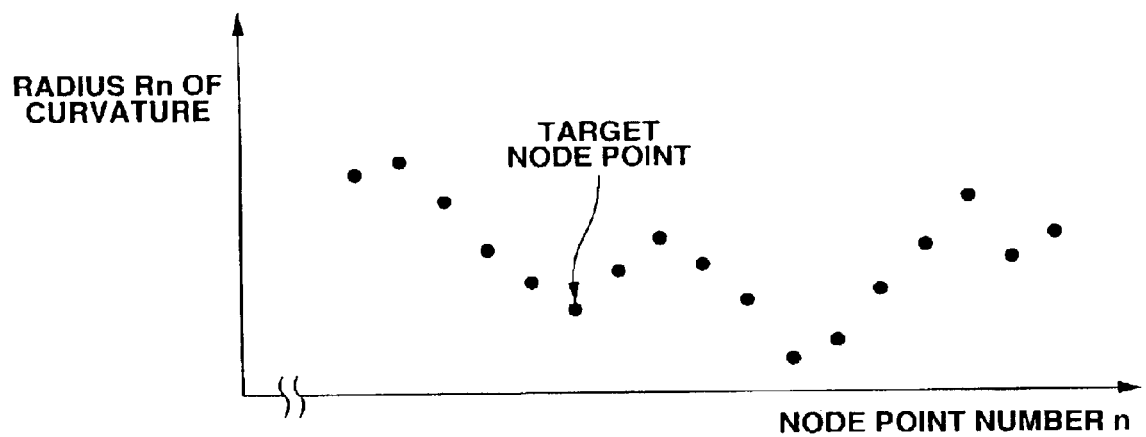
FIG. 3 is a graph employed for explaining a target node point.

At step S4, control unit 8 calculates the target node point, at which the vehicle should be decelerated at the largest degree of the deceleration, from the node points in the node information read at step S1. More specifically, as shown in FIG. 3, control unit 8 selects a node point which is in the node points ahead of the vehicle, whose radius $R_n$ of the road curvature calculated at step S3 takes a minimum value and which is located at the most adjacent position from the vehicle position. With this arrangement, it becomes possible to detect a node point which is located ahead of the vehicle and at which radius $R^n$ of the road curvature becomes minimum, the travel control system according to the present invention can adaptively execute the braking force control.

At step S5 control unit 8 calculates a road-surface friction coefficient $K\mu$. More specifically, control unit 8 calculates road-surface friction coefficient $K\mu$ on the basis of a relationship between the driving/braking force applied to each wheel 5FL, 5FR, 5RL, 5RR and a slippage condition of each wheel 5FL, 5FR, 5RL, 5RR as is disclosed in a U.S. Patent Application Publication No. US2001/0029419A1.

A method of calculating road-surface friction coefficient $K\mu$ may be not limited to the above-discussed method. For example, on a presumption that an infrastructure equipment for detecting road-surface friction coefficient $K\mu$ or an infrastructure equipment for storing a road-surface friction coefficient $K\mu$ is provided at an entrance of each curve of a road, the travel control system may be arranged to receive information indicative of road-surface friction coefficient $K\mu$ from such an infrastructure device. Further, a manual switch operated by a vehicle occupant may be provided, for example, a high-g switch to be turned on when road-surface friction coefficient $K\mu$ is around 0.8 g, a medium-g switch to be turned on when road-surface friction coefficient $K\mu$ is around 0.6 g, and a low-g switch to be turned on when road-surface friction coefficient $K\mu$ is around 0.4 g. This arrangement of the manual switches improve the easiness of setting the friction coefficient.

Figure 4:
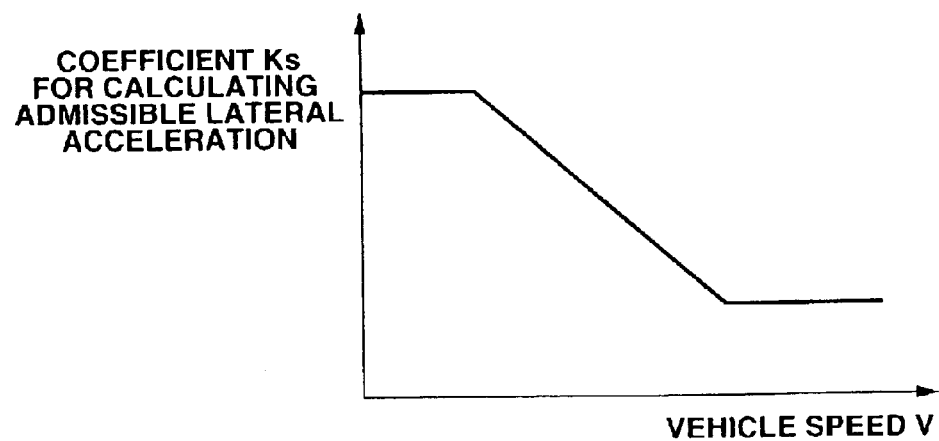
FIG. 4 is a graph employed for explaining a relationship between a vehicle speed and a allowable lateral deceleration coefficient.

At step S6 control unit 8 calculates a permissible lateral acceleration $Y_{glmit}$ on the basis of road surface friction coefficient $K\mu$ calculated at step S5. More specifically, permissible lateral acceleration $Y_{glmit}$ is calculated by multiplying road-surface friction coefficient $K\mu$ and a permissible lateral acceleration coefficient Ks such as 0.8 ($Y_{glmit}= K\mu$+Ks). Permissible lateral acceleration coefficient Ks may not be limited to a fixed value and may be varied according to increase of vehicle speed V when vehicle speed V is higher than or equal to a predetermined value, as shown in FIG. 4.

Figure 5:
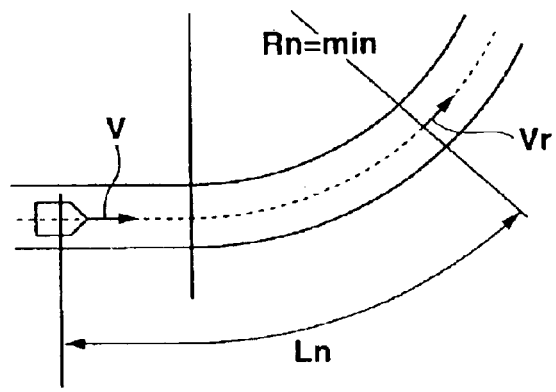
FIG. 5 is a view employed for explaining a calculation method of calculating a desired deceleration.

At step S7 control unit 8 calculates a desired deceleration $X_{gs}$ on the basis of permissible lateral acceleration $Y_{glmit}$ calculated at step S6. More specifically, as shown in FIG. 5, desired deceleration $X_{gs}$ is calculated on the basis of vehicle speed V calculated at step S2, radius $R_n$ of road curvature at the target node point, distance $L_n$ to the target node point and permissible lateral acceleration $Y_{glmit}$ calculated at step S6 according to desired deceleration $X_{gs}$, using the following expression (4).

$$\begin{aligned} X_{gs} &= (V^2 - Vr^2)/(2 \cdot L_n) \\ &= (V^2 - Y_{glmit}) \cdot |R_n|)/(2 \cdot L_n) \end{aligned} \quad (4)$$

where Vr ($Vr=(Y_{glmit}) \cdot |R_n|)^{1/2}$) is a desired vehicle speed at the target node point, and desired deceleration $X_{gs}$ takes a positive value when the vehicle is decelerated.

With the thus arranged embodiment according to the present invention, control unit 8 detects distance $L_n$ to the node point and radius $R_n$ at the node point wherein radius $R_n$ of road curvature ahead of the vehicle takes the minimum value, and calculates desired deceleration $X_{gs}$ according to the detected distance $L_n$ and radius $R_n$. Therefore, it becomes possible to calculate the appropriate desired deceleration.

At step S8 control unit 8 sets a control start allowance flag $F_{lgok}$ for permitting a start of the braking force control to stop the braking force control after the vehicle passed the target node point. More specifically, control unit 8 determines whether or not the vehicle enters a straight road from a curved road, that is, whether or not a magnitude of the radius Ro at the vehicle position on a road is greater than a threshold Ra such as 2000 m. When the affirmative determination is made, control unit 8 sets control start allowance flag $F_{lgok}$ is set at 1 ($F_{lgok}=1$).

Subsequently, control unit 8 determines whether or not the vehicle on a winding road including an S-shaped curve enters a new curve, that is, a new node point is calculated as a target node point at step S4, and it is determined whether or not a plus and minus reference of the radius $R_n$ of road curvature at the new node point is turned relative to the previous radius $R_n$ at the previous node point. When the plus and minus reference of radius $R_n$ at the node point becomes different from that of new radius $R_n$ at the new node point, the control start flag $F_{lgok}$ is set at 1 ($F_{lgok}=1$).

In contrast to this, when a magnitude of radius Ro of road curvature at the vehicle position is smaller than or equal to threshold Ra and when the plus and minus reference is not changed between the radius $R_n$ at the previous node point and the radius $R_n$ at the new node point, the content of control start allowance flag $F_{lgok}$ is maintained ($F_{lgok}=1$) When the braking force control is executed and when an operable state flag $F_{lggensoku}$ is set at 1, control start allowance flag $F_{lgok}$ is reset ($F_{lgok}=0$).

At step S9 control unit 8 executes an alarm starting determination for determining whether an alarm for informing a vehicle occupant to start the braking force control is started. More specifically, when control start allowance flag $F_{lgok}$ calculated at step S8 is set at 1 ($F_{lgok}$=1), when warning flag $F_{lgwarn}$ set in the previous routine is in a reset state ($F_{lgwarn}$=0) and when desired deceleration $X_{gs}$ calculated at step S7 is greater than or equal to a predetermined threshold $X_{gswarn}$ such as 0.08 g, warning flag $F_{lgwarn}$ is set at 1 ($F_{lgwarn}$=1).

Subsequently, when control start allowance flag $F_{lgok}$ calculated at step S8 is set at 1 ($F_{lgok}$=1), when warning flag $F_{lgwarn}$ set in the previous routine is in reset state ($F_{lgwarn}$=0), and when desired deceleration Xgs is greater than or equal to a value obtained by subtracting a constant $K_{hwarn}$ from threshold $X_{gswarn}$ ($X_{gs} \geq (X_{gswarn}-K_{hwarn})$), warning flag $F_{lgwarn}$ is set at 1 ($F_{lgwarn}$=1) Constant $K_{hwarn}$ is a constant employed for preventing hunching of the alarm operation and is set, for example, at 0.03 g.

In contrast to this, when control start allowance flag $F_{lgok}$ calculated at step S8 is reset ($F_{lgok}$=0), that is, when the above-discussed conditions are not satisfied, warning flag $F_{lgwarn}$ is reset ($F_{lgwarn}$=0).

At step S10 control unit 8 executes a control start determination for determining a start of the braking force control, on the basis of desired deceleration $X_{gs}$ calculated at step S7 and control start allowance flag $F_{lgok}$ set at step S8. More specifically, when control start allowance flag $F_{lgok}$ calculated at step S8 is set at 1 ($F_{lgok}$=1), when operable state flag $F_{lggensoku}$ set in the previous processing is reset ($F_{lggensoku}$=0), and when desired deceleration $X_{gs}$ calculated at step S7 is greater than a control operation determining threshold $X_{gsgensoku}$ (such as 0.1 g), operable state flag $F_{lggesoku}$ indicative that the braking force control is being executed is set at 1 ($F_{lggesoku}$=1).

Subsequently, when control start allowance flag $F_{lgok}$ calculated at step S8 is in set state ($F_{lgok}$=1), when operable state flag $F_{lggensoku}$ set in the previous processing is in set state ($F_{lggensoku}$=1), and when desired deceleration $X_{gs}$ calculated at step S7 is greater than or equal to a value ($X_{gsgensoku}$-Kh) obtained by subtracting a constant Kh from control determination threshold $X_{gsgensoku}$, operable state flag $F_{lggesoku}$ is set at 1 ($F_{lggesoku}$=1). Herein, constant Kh is a constant for preventing hunching of the braking force control.

In contrast to this, when control start allowance flag $F_{lgok}$ calculated at step S8 is reset ($F_{lgok}$=0), that is, when the above-discussed conditions are not satisfied, operable state flag $F_{lggensoku}$ is reset ($F_{lggensoku}$=0). With this arrangement according to the present invention, when control start allowing flag $F_{lgok}$ is in reset state ($F_{lgok}$=0) and after it is detected that the vehicle passed the target node point, the braking force control is stopped. Therefore, this arrangement suppresses a vehicle occupant from having strange feeling.

Thresholds $X_{gswarn}$ and $X_{gsgensoku}$ employed in steps S9 and S10 respectively may not be limited to fixed values. For example, a brightness around the vehicle is determined according to an operating condition of head rights of the vehicle, and thresholds $X_{gswarn}$ and $X_{gsgensoku}$ may be varied according to the brightness around the vehicle when a vehicle occupant feels that the vehicle speed in a dark state around the vehicle is higher as compared with that in the bright state.

Figure 6:
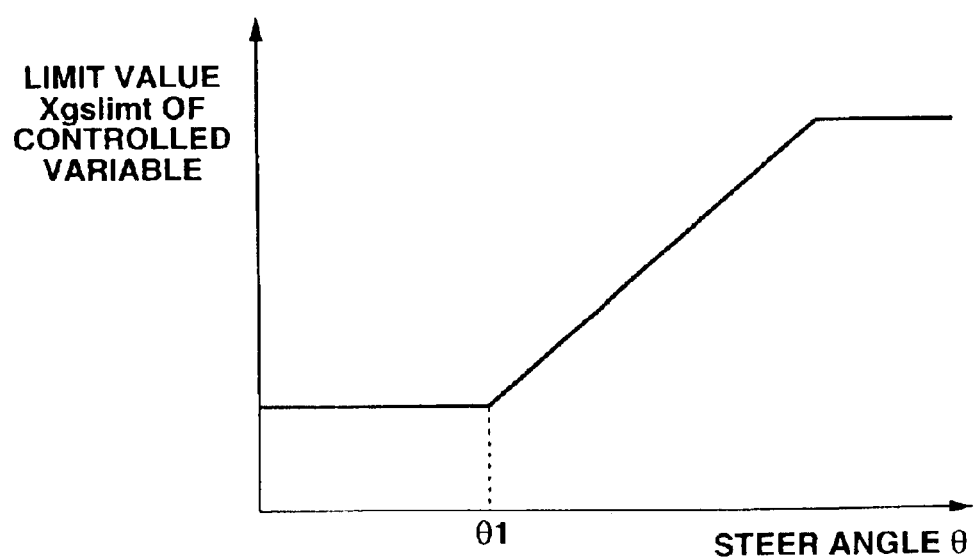
FIG. 6 is a graph employed for explaining a relationship between a steer angle and a controlled variable limit value.

At step S11 control unit 8 calculates a controlled-variable limit value $X_{gslimt}$ for limiting desired deceleration $X_{gs}$ calculated at step S7 on the basis of the steer angle θ. More specifically, as shown in FIG. 6, when steer angle θ read at step S1 is smaller than or equal to a predetermined value θ1, controlled-variable limit value $X_{gslimt}$ is set at a constant value. When steer angle θ is greater than predetermined value θ1, controlled-variable limit value $X_{gslimt}$ is calculated so as to increase as steer angle θ increases.

Since the first embodiment according to the present invention is arranged such that controlled-variable limit value $X_{gslimt}$ is increased as steer angle θ is increased according to an increasing of an entering degree of the vehicle into a curve, it becomes possible to largely decelerate the vehicle. This achieves preferable controllability. Further, the first embodiment is arranged such that controlled-variable limit value $X_{gslimt}$ is detected on the basis of steer angle θ. Accordingly, the deceleration of the vehicle is not executed when steer angle θ is maintained at a constant value. This prevents a vehicle occupant from having a strange feeling.

Figure 7:
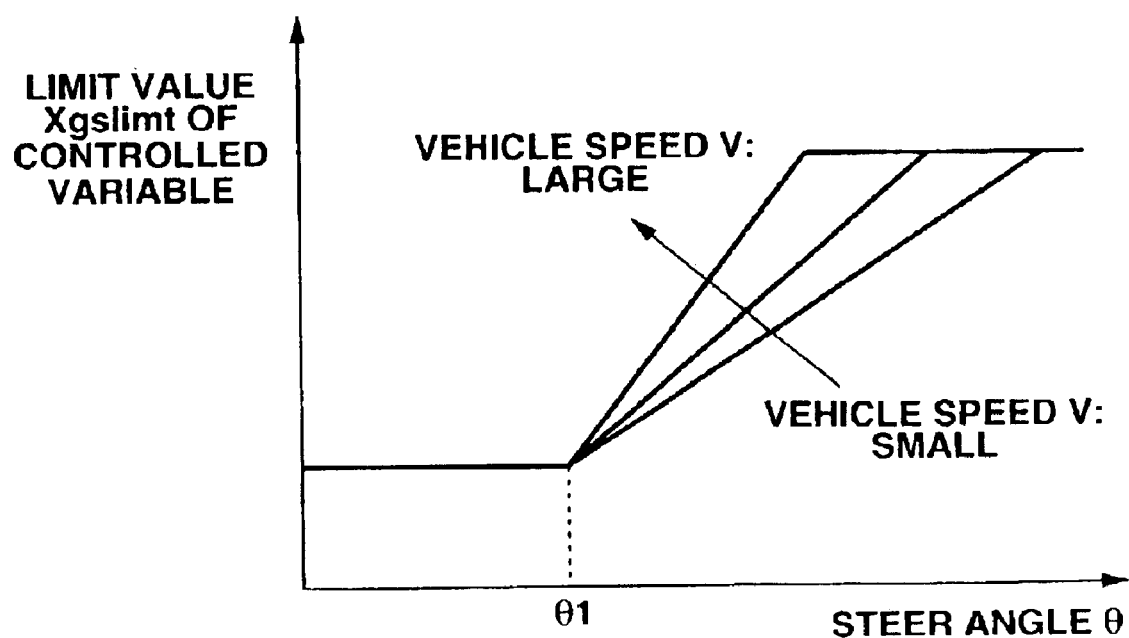
FIG. 7 is a graph employed for explaining a relationship among the steer angle, the controlled variable limit value and the vehicle speed.

Further, a function for calculating controlled-variable limit value $X_{gslimt}$ is not limited to a function varying according to the steer angle θ. For example, as shown in FIG. 7, it may be permissible to employ a function where an increasing rate of controlled-variable limit value $X_{gslimt}$ increases as vehicle speed V increases.

At step S12 control unit 8 calculates a corrected desired deceleration $X_{gsh}$ which is corrected by limiting desired deceleration $X_{gs}$ calculated at step S7 by controlled-variable limit value $X_{gslimt}$ calculated at step S11.

At step S13 control unit 8 calculates a brake fluid pressure to be supplied to wheel cylinders 6FL, 6FR, 6RL and 6RR of the respective wheels 5FL, 5FR, 5RL and 5RR. More specifically, control unit 8 determines whether or not operable state flag $F_{lggensoku}$ is in set state. When $F_{lggensoku}$=1, the braking force control is executed. First, control unit 8 calculates a desired brake fluid pressure Pc by multiplying the corrected desired deceleration $X_{gsh}$ calculated at step S12 and a constant Kb determined from the specification of the brake system. Next, control unit 8 selects a larger one between desired brake fluid pressure Pc and a master cylinder pressure Pm generated by a driver's manipulation, as a front-wheel desired brake fluid pressure Psf. Further, control unit 8 calculates a rear-wheel desired brake fluid pressure Psr so as to produce a preferable distribution of the braking torque (braking force) between front wheels and rear wheels, on the basis of front-wheel desired brake fluid pressure Psf. With the first embodiment according to the present invention, the vehicle is decelerated on the basis of corrected desired deceleration $X_{gsh}$, and therefore it becomes possible to easily set the deceleration according to the node information.

In contrast to this, when operable state flag $F_{lggensoku}$ is in reset state ($F_{lggensoku}$=0), the braking force control is not executed. Master cylinder pressure Pm is employed as frost-wheel desired brake fluid pressure Psf, and rear-wheel desired brake fluid pressure Psr is calculated on the basis of front-wheel desired brake fluid pressure Psf so as to realize an optimum front and rear distribution of the braking force.

At step S14 control unit 8 calculates a driving torque for driving drive wheels 5RL and 5RR. More specifically, when operative state flag $F_{lggensoku}$ is in set state ($F_{lggensoku}$=1), control unit 8 calculates desired driving torque Trqds by subtracting a brake torque g(Pc), which is predicted to be generated according to desired brake fluid pressure Pc calculated at step S14, from desired driving torque f(Acc) calculated according to accelerator opening Acc read at step S1.

In contrast to this, when operable state flag $F_{lggensoku}$ is in reset state ($F_{lggensoku}$=0), control unit 8 sets desired driving torque Trqds at desired driving torque f(Acc) calculated according to accelerator opening Acc.

At step S15 control unit 8 outputs desired brake fluid pressures Psf and Psr of wheels 5FL, 5FR, 5RL and 5RR to brake fluid pressure control circuit 7, and outputs desired driving torque Trqds for driving wheels 5RL and 5RR calculated at step S14 to driving torque control unit 12. Then, when warning flag $F_{lgwarn}$ is in set state ($F_{lgwarn}$=1), control unit 8 commands alarm device 21 to provide the warning through a display and a speaker to vehicle occupant. Thereafter the routine returns to the main program.

Figure 8A:
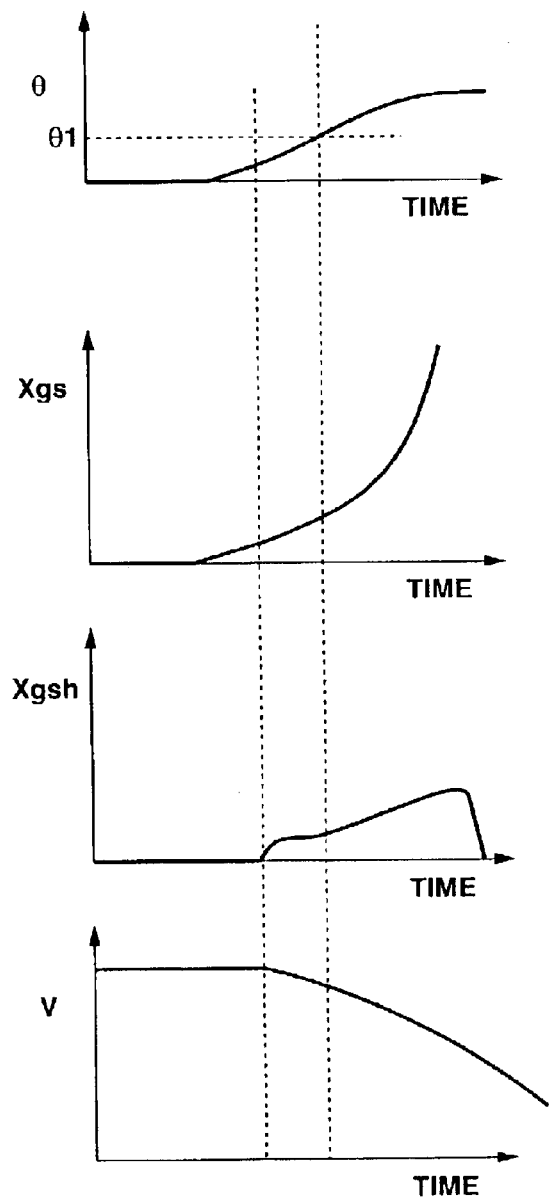
FIGS. 8A and 8B are time charts employed for explaining the operation of the vehicle equipped with the travel control system of the first embodiment.

By executing this processing, when the vehicle approaches a curve of a traveling road, control unit 8 reads information from various sensors, and calculates desired deceleration Xgs on the basis of the read information. When desired deceleration Xgs is greater than or equal to 0.1 g, operative state flag $F_{lggensoku}$ is set at 1 ($F_{lggensoku}$=1), and controlled variable limit value $X_{gslimt}$ is calculated on the basis of steer angle θ. Further, corrected desired deceleration $X_{gsh}$ is calculated by limiting desired deceleration $X_{gs}$ by controlled variable limit value $X_{gslimt}$, and the braking force is generated so as to achieve the corrected desired deceleration $X_{gsh}$. With this arrangement, as shown in FIG. 8A, when a degree of entering a curve of the road is large and when steer angle θ is large, corrected desired deceleration $X_{gsh}$ increases and vehicle speed V largely decreases. Accordingly, this arrangement sufficiently ensures the aimed advantages.

Further, in the event that an error of information detected by car navigation system 15 is large due to a large error of the vehicle position, even if desired deceleration $X_{gs}$ detected to take a large value, corrected desired deceleration $X_{gsh}$ takes a small value as far as steer angle θ is small. This arrangement decreases the deceleration of the vehicle decreases, and prevents a vehicle occupant from having strange feeling in operation of the vehicle.

Figure 8B:
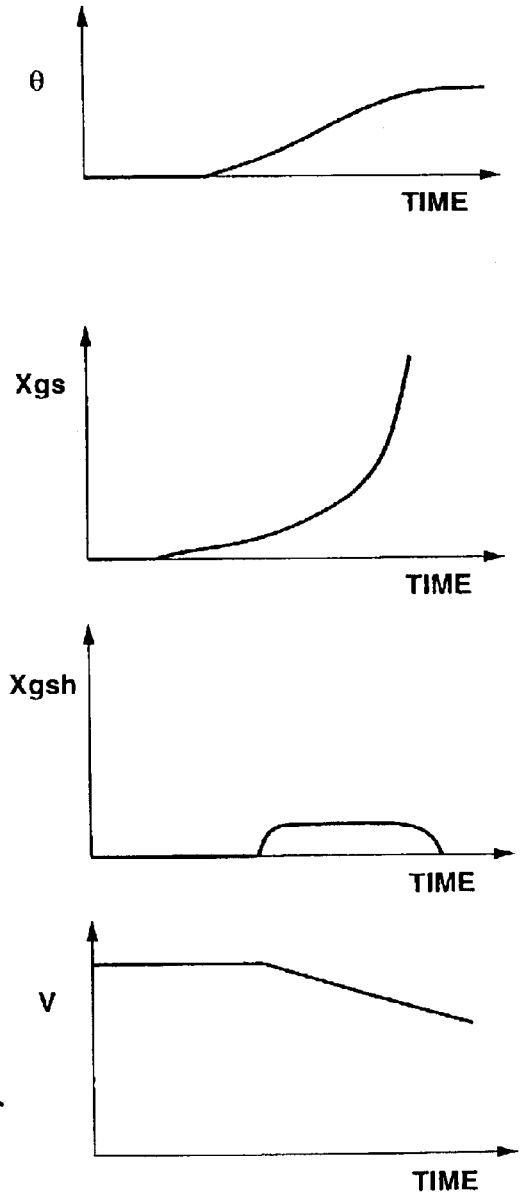

In contrast to this, if controlled variable limit value $X_{gslimt}$ for limiting desired deceleration $X_{gs}$ is constant as shown in FIG. 8B, corrected desired deceleration $X_{gsh}$ is constantly kept small. Therefore, under this small setting of corrected desired deceleration, it is difficult to achieve the desired control.

In the first embodiment according to the present invention, car navigation system 15 functions as a curve information detecting means and a forward curve information detecting means. Steer angle sensor 19 functions as a driving condition detecting means. Step S11 in the flowchart of FIG. 2 functions as a curve entering degree of the vehicle. Wheel speed sensors 20FL, 20FR, 20RL and 20RR function as a vehicle speed detecting means. Steps S7 and S11 through S15 function as a driving/braking force control means. Step S7 functions as a desired deceleration calculating means. Steps S11 through S15 function as a desired deceleration calculating means. GPS 13 of car navigation system 15 functions as a vehicle position detecting means. Medium 14 functions as a road information storing means.

With the thus arranged first embodiment according to the present invention, control unit 8 detects the curve information of a road ahead of the vehicle, an entering degree of the vehicle into the curve and the vehicle speed. Further, when control unit 8 detects that the vehicle is in the curve of the road, the vehicle is largely decelerated on the basis of the curve information and the vehicle speed. Accordingly, it becomes possible to suppress a vehicle occupant from having strange feeling and to assure a sufficient advantage in the control of the vehicle.

Further, control unit 8 detects the curve entering degree of the vehicle on the basis of steer angle θ from steer angle sensor 19, the curve information of the road ahead of the vehicle from car navigation system 15, and the vehicle speed from wheel speed sensors. When control unit 8 detects that the vehicle is traveling on a curve of the road, the vehicle is capable of being largely decelerated on the basis of the curve information and the vehicle speed. Accordingly, it becomes possible to suppress a vehicle occupant from having strange feeling and to ensure a sufficient advantage in the control of the vehicle.

Furthermore, since the curve entering degree of the vehicle is detected on the basis of a quantity of steered angle of a steering wheel, the deceleration is not varied when the quantity of steered angle of a steering wheel is constant. This arrangement prevents the vehicle occupant from having strange feeling in the operation of the vehicle.

Further, the travel control system of the first embodiment according to the present invention is arranged such that the desired deceleration is calculated on the basis of the curve information and the vehicle speed, and the vehicle is decelerated on the basis of the desired deceleration and the curve entering degree. This facilitates setting of the deceleration according to the curve information.

Additionally, the travel control system of the first embodiment is arranged such that the remained distance to a predetermined point in a curve and the desired vehicle speed at the predetermined point are calculated, and the desired deceleration is calculated according to the remained distance, the desired vehicle speed and the actual vehicle speed. Therefore, it becomes possible to calculate the proper desired vehicle speed at the predetermined point. Although the first embodiment according to the present invention has been shown and described to employ the target node point ads the predetermined point. It will be understood that the predetermined point is not limited to this and may be determined at a point set based on the other determination standard.

Furthermore, the curve information of the road ahead of the vehicle is detected with reference to the road information stored in the road information storing means and on the basis of the information of the vehicle position. It becomes possible that the vehicle independently executes the driving/braking control when the vehicle travels an area whose road information has been stored in the road information storing means, without receiving the information from an external device.

Further, the travel control system of the first embodiment is arranged so as to detect a turn severe point where a radius of the road curvature ahead of the vehicle becomes minimum, or a distance to a turn severe point where the vehicle speed travels at lowest vehicle speed, and a radius of the road curvature at the turn severe point. This enables the system to execute the proper driving/braking force control.

Further, the travel control system of the first embodiment is arranged such that the driving/braking force control is stopped after control unit 8 determined on the basis of the curve information that the vehicle passed the turn severe point.

Furthermore, the travel control system of the first embodiment according to the present invention is arranged to decelerate the vehicle using at least one of a lowering of the output of the driving force generating apparatus, a changeover of a gear ratio of a transmission and an increase of the output of the driving/braking force generating apparatus. Therefore, it becomes possible to easily decelerate the vehicle.

Figure 10:
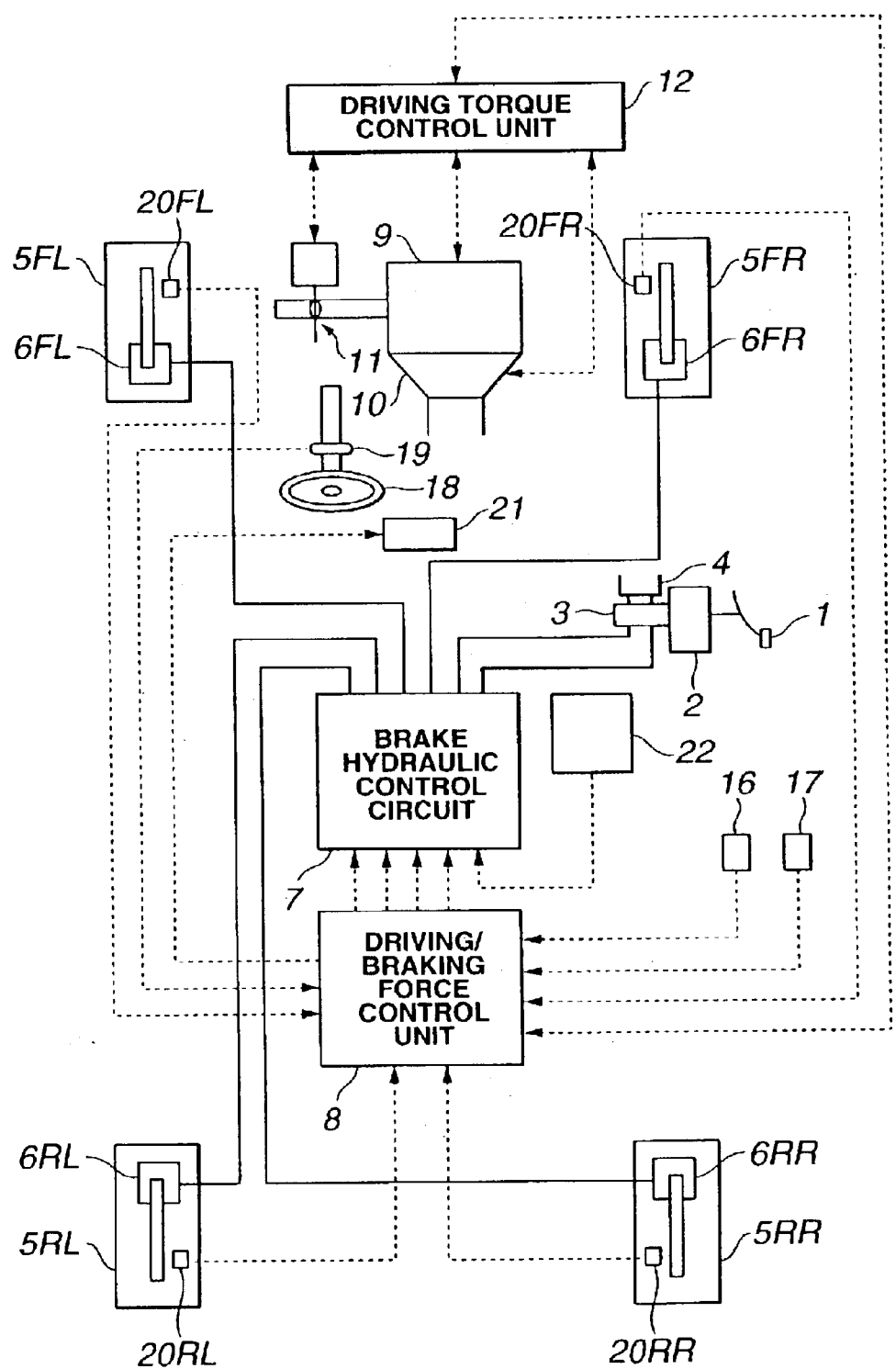
FIG. 10 is a schematic view showing a travel control system of a third embodiment according to the present invention.

Referring to FIGS. 9 and 10, there is shown a second embodiment of the travel control system according to the present invention.

The second embodiment is specifically arranged to execute the driving/braking force control on the basis of the reliability of the information detected by car navigation system 15. The processing of driving/braking force control unit 8 of the second embodiment is executed according to a flowchart of FIG. 9 instead of the flowchart of FIG. 2.

Figure 2:
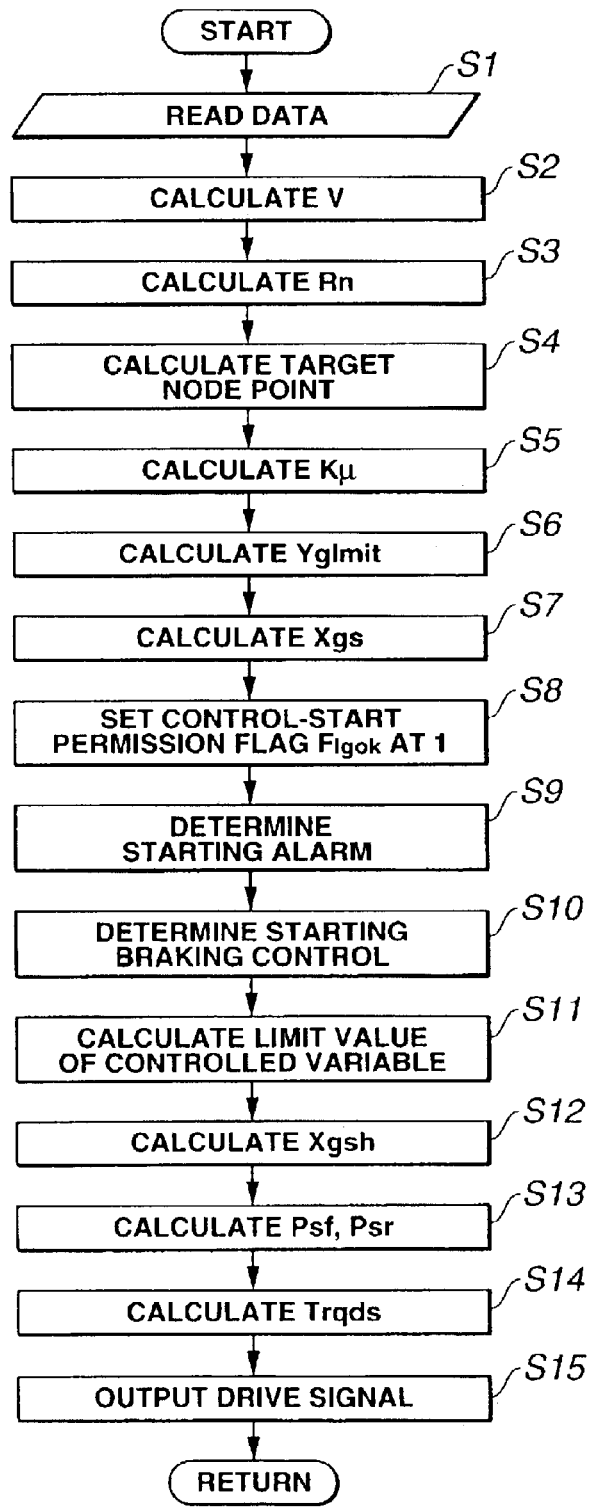
FIG. 2 is a flowchart showing a calculation processing executed by a driving/braking force control unit of FIG. 1.

The processing of FIG. 9 includes steps that are the same as steps executed in the processing of FIG. 2, and therefore, the same steps are denoted by same references and the explanation thereof is omitted herein. The processing of FIG. 9 newly includes steps S16, S17 and S18 instead of step S11 of FIG. 2.

At step S16 subsequent to the execution of step S10, control unit 8 calculates an estimated steer angle θr, which is an estimate of steer angle θ steered by a vehicle occupant, on the basis of the node information of the vehicle position and the like. More specifically, control unit 8 calculates estimated steer angle θr on the basis of radius Ro of road curvature at the vehicle position, using the following expression (5).

$$\theta r = Ro \cdot Lw \cdot N \cdot (1 + A \cdot V^2) \quad (5)$$

At step S17 control unit 8 determines the reliability of the node information read from car navigation system 15. More specifically, control unit 8 determines whether a magnitude of a difference between estimated steer angle θr and actual steer angle θ is smaller than or equal to a preset reliability threshold θL and whether actual steer angle θ is greater than or equal to a preset minimum threshold θmin. When the magnitude of the difference is smaller than or equal to preset reliability threshold θL and when actual steer angle θ is greater than or equal to preset minimum threshold θmin, a reliability determination flag $F_{lgconf}$, which indicates that the node information sent from car navigation system 15 has a high reliability, is set at 1 ($F_{lgconf}=1$). When the magnitude of the difference is not smaller than or equal to preset reliability threshold θL or when actual steer angle θ is not greater than or equal to preset minimum threshold θmin, reliability determination flag $F_{lgconf}$ is reset ($F_{lgconf}=0$) Reliability threshold θL may be a fixed value or a functional value, which increases as vehicle speed V increases.

At step S18 control unit 8 sets controlled variable limit value $X_{gslimt}$ on the basis of reliability threshold flag $F_{lgconf}$. More specifically, when $F_{lgconf}=0$, controlled variable limit value $X_{gslimt}$ is set at a first limit value $X_{gslimt1}$. When $F_{lgconf}=1$, controlled variable limit value $X_{gslimt}$ is set at a second limit value $X_{gslimt2}$, which is greater than first limit value $X_{gslimt1}$. These first and second limit values $X_{gslimt1}$ and $X_{gslimt2}$ may be fixed value or may be functional values which increase as steer angle θ increases, as is similar to that in the first embodiment.

With the processing executed in the second embodiment, the following operations are sequentially executed.

When the vehicle approaches a curve of a traveling road, control unit 8 reads information from sensors. Desired deceleration $X_{gs}$ is calculated on the basis of the information. When desired deceleration $X_{gs}$ is greater than or equal to 0.1 g, operable state flag $F_{lggensoku}$ is set ($F_{lggensoku}=1$). Estimated steer angle θr is estimated on the basis of the node information as to a point at which the vehicle is traveling. When estimated steer angle θr is approximately equal to actual steer angle θ, reliability determination flag $F_{lgconf}$ is set ($F_{lgconf}=1$). Controlled variable limit value $X_{gslimt}$ is set on the basis of the set condition of the reliability determination flag $F_{lgconf}$. Corrected desired deceleration $X_{gsh}$ is calculated by limiting desired deceleration $X_{gs}$ using controlled variable limit value $X_{gslimt}$. The braking force is produced so as to bring actual deceleration closer to corrected desired deceleration $X_{gsh}$.

With this arrangement of the second embodiment according to the present invention, when the node information received from car navigation system 15 has high reliability, corrected desired deceleration is set large and vehicle speed V is largely decreased. Therefore, the travel control system of the second embodiment sufficiently executes the vehicle control. Further, when an error of car navigation system 15 is large and when the reliability of the node information is small, corrected desired deceleration $X_{gsh}$ is set small even if desired deceleration $X_{gs}$ detected large. Accordingly, corrected desired deceleration $X_{gsh}$ is set small, and the deceleration of the vehicle becomes small. This arrangement prevents a vehicle occupant from having a strange feeling.

In this second embodiment according to the present invention, car navigation system 15 functions as a curve information detecting means. Wheel speed sensors 20FL, 20FR, 20RL and 20RR function as a vehicle speed detecting means. Step S7 functions as a desired deceleration calculating means. Steps S7 and S11 through S15 function as a driving/braking force control means. Steer angle sensor 19 functions as a driving condition detecting means. Step S17 functions as a comparing means. Steps S12 and S18 function as a desired deceleration correcting means.

With the thus arranged second embodiment according to the present invention, the limit value is set according to the reliability of the curve information, and the desired deceleration is corrected by limiting the desired deceleration by the limit value. Accordingly, when the curve information has a high reliability, the limit value is set large. This enables the vehicle to be largely decelerated by executing driving/braking force control, and ensures sufficient advantages of the control.

Further, the driving condition is estimated on the basis of the curve information, and the reliability of the curve information is determined on the basis of the estimated driving condition and the actual driving condition. Therefore, it becomes possible to accurately detect the reliability of the curve information.

Referring to FIG. 10, there is shown a third embodiment of the travel control system according to the present invention.

The third embodiment is arranged to employ a communication device 22 instead of car navigation system 15 shown in FIG. 1, as shown in FIG. 10. Communication device 22 obtains the node information by communicating with an infrastructure device, which is disposed at an entrance of a curve ahead of the vehicle and detects the node information $(X_n, Y_n, L_n)$, or an infrastructure device, which has previously stored the node information. The travel control system can executes the driving/braking force control on the basis of the curve information.

In this third embodiment, communication device 22 functions as a curve information detecting means.

With the thus arranged third embodiment, control unit 8 receives the curve information from one of the infrastructure device, which is disposed at an entrance of a curve ahead of the vehicle and detects the node information $(X_n, Y_n, L_n)$, and an infrastructure device, which has previously stored the node information. Further, control unit 8 detects the curve information of a road ahead of the vehicle. Therefore, it becomes possible to properly execute the driving/braking force control on the basis of the accurate road information.

This application is based on Japanese Patent Application No. 2002-51772 filed on Feb. 27, 2002 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. For example, although the second embodiment according to the present invention has been shown and described such that the reliability of the node information is determined on the basis of actual steer angle θ and estimated steer angle θr, this method may be replaced with a method wherein control unit 8 detects a circumstance of a road ahead of the vehicle using a camera or a laser device, estimates a radius of a road curvature on the basis of the detected circumstance, and determines that the reliability of the node information is high when a difference between the radius of the estimated result and the radius of the node information is smaller than or equal to a predetermined value.

The scope of the invention is defined with reference to the following claims.

What is claimed is:

1. A travel control system, for a vehicle; comprising:
   a control unit configured:
      to obtain curve information as to a curve of a road ahead of the vehicle,
      to obtain a driving condition produced by a vehicle occupant,
      to obtain a curve entering degree of the vehicle into the curve on the basis of the driving condition,
      to obtain a vehicle speed, and
      to decelerate the vehicle on the basis of the curve information and the curve entering degree and the vehicle speed;
      wherein the operation for decelerating the vehicle comprises a desired deceleration calculating operation for calculating the desired deceleration on the basis of the curve information and the vehicle speed, and a desired deceleration generating operation for decelerating the vehicle on the basis of the desired deceleration and the curve entering degree.

2. The travel control system as claimed in claim 1, wherein the control unit is further configured to increase a degree of deceleration of the vehicle as the curve entering degree increases.

3. The travel control system as claimed in claim 1, wherein the control unit is further configured to obtain a steered quantity of the steer angle, and to obtain the curve entering degree on the basis of the steered quantity.

4. The travel control system as claimed in claim 1, wherein the operation for obtaining the curve information comprises a detecting operation for detecting a vehicle position, a storing operation for storing road information, an obtaining operation for obtaining the curve information on the basis of the vehicle position and the stored road information.

5. The travel control system as claimed in claim 1, wherein the control unit is configured to decelerate the vehicle by means of at least one of an output lowering of a driving force generating apparatus, a gear ratio change of a transmission, and an output increase of a braking force generating apparatus.

6. The travel control system as claimed in claim 1, further comprising a steer angle sensor for detecting a steer angle of the vehicle, the control unit being configured to determine the curve entering degree on the basis the steer angle.

7. A travel control system for a vehicle, comprising:
   a control unit configured:
      to obtain curve information as to a curve of a road ahead of the vehicle,
      to obtain a vehicle speed,
      to calculate a desired deceleration on the basis of the curve information and the vehicle speed,
      to decelerate the vehicle on the basis of the desired deceleration,
      to obtain a driving condition produced by a vehicle occupant,
      to determine a reliability of the curve information on the basis of the driving condition and the curve information, and
      to correct the desired deceleration on the basis of the reliability of the curve information;
      wherein, the control unit, to determine a reliability of the curve information on the basis of the driving condition and the curve information, is adapted to execute an estimating operation for estimating an estimated driving condition produced by a vehicle occupant on the basis of the curve information, and a comparing operation for detecting a reliability of the curve information on the basis of the estimated driving condition and the obtained driving condition.

8. The travel control system as claimed in claim 7, wherein the operation for calculating the desired deceleration calculates a residual distance to a predetermined point in a curve and a desired vehicle speed at the predetermined point and calculates the desired deceleration according to the vehicle speed, the residual distance and the desired vehicle speed.

9. The travel control system as claimed in claim 7, wherein the control unit is further configured to set a limit value according to the reliability of curve information and to obtain a corrected desired deceleration by limiting the desired deceleration by the limit value.

10. The travel control system as claimed in claim 7, wherein the operation for obtaining the curve information comprises a receiving operation for receiving the curve information from an infrastructure device which is disposed near a curve and which detects or stores the curve information.

11. A travel control system for a vehicle; comprising:
    a control unit configured:
       to obtain curve information as to a curve of a road ahead of the vehicle,
       to obtain a driving condition produced by a vehicle occupant,
       to obtain a curve entering degree of the vehicle into the curve on the basis of the driving condition,
       to obtain a vehicle speed, and
       to decelerate the vehicle on the basis of the curve information and the curve entering degree and the vehicle speed;
       wherein the operation for obtaining the curve information comprises a first obtaining operation for obtaining a distance from the vehicle to one of a turn sever point where a radius of a curvature of a road ahead of the vehicle becomes minimum or where the vehicle is most decelerated, and a second obtaining operation for obtaining the radius of the curvature at the turn sever point.

12. The travel control system as claimed in claim 11, wherein the control unit is further configured to stop decelerating the vehicle when the vehicle passed the turn sever point on the basis of the curve information.

13. A travel control system for a vehicle; comprising:
    a control unit configured:
       to obtain curve information as to a curve of a road ahead of the vehicle,
       to obtain a driving condition produced by a vehicle occupant, to obtain a curve entering degree of the vehicle into the curve on the basis of the driving condition, to obtain a vehicle speed, to decelerate the vehicle on the basis of the curve information and the curve entering degree and the vehicle speed; and to increase the deceleration of the vehicle upon a determination that the vehicle enters the curve on the basis of the curve entering degree.

14. A method of controlling a vehicle comprising:

obtaining curve information of a road ahead of the vehicle;

obtaining a driving condition produced by a vehicle occupant;

obtaining a curve entering degree of the vehicle on the basis of the driving condition;

obtaining a vehicle speed;

decelerating the vehicle on the basis of the curve information and the curve entering degree and the vehicle speed; and increasing a degree of deceleration of the vehicle as the curve entering degree increases.

15. A travel control system for a vehicle, comprising:

curve information obtaining means for obtaining curve information of a road ahead of the vehicle;

driving condition obtaining means for obtaining a driving condition produced by a vehicle occupant;

curve entering degree obtaining means for obtaining a curve entering degree of the vehicle on the basis of the driving condition;

vehicle speed obtaining means for obtaining a vehicle speed; and braking force control means for decelerating the vehicle on the basis of the curve information and the curve entering degree and the vehicle speed;

wherein the travel control system further includes a means for increasing a degree of deceleration of the vehicle as the curve entering degree increases.

16. A travel control system for a vehicle; comprising:

a road information obtaining system that obtains road information as to a curve of a road ahead of the vehicle, from one of an external information system and an information storage system in the vehicle;

a vehicle driving condition detector detecting a driving condition of he vehicle, which condition is varied by a vehicle occupant;

a wheel speed detector detecting at least one of wheel speeds of wheels of the vehicle;

a brake system that generates a braking force according to a braking command; and a control unit connected with the road information obtaining system, the vehicle driving condition detector, the wheel speed detector and the brake system, the control being configured, to obtain the curve information from the road information obtaining system, to obtain the driving condition from the vehicle driving condition detector, to obtain a curve entering degree of the vehicle into the curve on the basis of the driving condition, to calculate a vehicle speed on the basis of the wheel speed, to output the braking command to the brake system on the basis of the curve information and the curve entering degree and the vehicle speed to decelerate the vehicle; and increase a degree of deceleration of the vehicle as the curve entering degree increases.

* * * * *